(12) United States Patent
Gluhovsky et al.

(10) Patent No.: US 7,081,823 B2
(45) Date of Patent: Jul. 25, 2006

(54) SYSTEM AND METHOD OF PREDICTING FUTURE BEHAVIOR OF A BATTERY OF END-TO-END PROBES TO ANTICIPATE AND PREVENT COMPUTER NETWORK PERFORMANCE DEGRADATION

(75) Inventors: Ilya Gluhovsky, Mountain View, CA (US); Alan J. Hoffman, Greenwich, CT (US); Herbert M. Lee, New Fairfield, CT (US); Emmanuel Yashchin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 10/697,273

(22) Filed: Oct. 31, 2003

(65) Prior Publication Data

US 2005/0097207 A1    May 5, 2005

(51) Int. Cl.
*G08B 21/00* (2006.01)

(52) U.S. Cl. .............. 340/636.1; 340/636.12; 340/636.13; 340/636.15; 340/514

(58) Field of Classification Search ............. 340/636.1, 340/636.12, 636.13, 636.15, 514; 709/223, 709/224; 702/179–185
See application file for complete search history.

(56) References Cited

U.S. PATENT DOCUMENTS

| | | | | |
|---|---|---|---|---|
| 5,345,392 A | * | 9/1994 | Mito et al. | ................... 713/300 |
| 6,968,291 B1 | * | 11/2005 | Desai | ......................... 702/182 |

* cited by examiner

*Primary Examiner*—Julie Bichngoc Lieu
(74) *Attorney, Agent, or Firm*—Whitham, Curtis, Christofferson & Cook, PC; Stephen C. Kaufman

(57) ABSTRACT

A diagnostic system in which, at every point in time, a forecast is made of the future response times of each EPP (End-to-end Probe Platform) probe in a battery of probes. Thresholds are established in terms of the distribution of future EPP values. The theory of Generalized Additive Models is used to build a predictive model based on a combination of a) data normally generated by network nodes, b) results of a battery of probes and c) profile curves reflecting expected response times (i.e. based on recent history) corresponding to this battery for various times of day, days of week, month of year, etc. The model is pre-computed, and does not have to be dynamically adjusted. The model produces, at regular intervals, forecasts for outcomes of various EPP probes for various horizons of interest; also, it produces thresholds for the respective forecasts based on a number of factors, including acceptable rate of false alarms, forecast variance and EPP values that are expected based on the recorded history. The system is capable of maintaining a pre-specified low rate of false alarms that could otherwise cause a substantial disturbance in network operation.

20 Claims, 3 Drawing Sheets

SYSTEM AND METHOD OF PREDICTING FUTURE BEHAVIOR OF A BATTERY OF END-TO-END PROBES TO ANTICIPATE AND PREVENT COMPUTER NETWORK PERFORMANCE DEGRADATION

BACKGROUND OF THE INVENTION

1. Field of the Invention

The present invention generally relates to diagnostic tools for distributed computer networks and, more particularly, to a diagnostic system that uses advanced statistical methodology to build a predictive model of future behavior of a battery of probes that aids in detecting an upcoming network problem and in detecting the presence of longer term trends in the data.

2. Background Description

In the course of normal operation, a distributed computer network produces a large amount of data related to various nodes, such as servers and routers. In addition, a series of probes are deployed to submit pre-assigned tasks to various nodes of the network, and the response times of these tasks are recorded.

Managing the delivery of information services in distributed computing environments continues to be a tremendous challenge, even after more than a decade of experience.

Nevertheless, understanding of Information Technology (IT) service delivery has improved. Initially, only isolated measurements of infrastructure components, such as servers, hubs and routers, were available. Incrementally, component measurement methods have increased in sophistication, and in general meet the reporting and diagnostic requirements of their respective support groups.

However, user experience can be at variance with reported component reliability and availability. A technology was developed (in U.S. Pat. No. 6,070,190 to Reps et al., assigned to the present assignee) to answer the question: What is the customer experience? This is achieved by a client based application program monitor, using application probe software residing at the client, which records information related to the performance for the client of application services residing on a server in a distributed environment.

When a distributed environment is relatively simple, these data and analyses are sufficient to manage the environment. However, in an increasing number of cases found particularly among leaders in the use of electronic business platforms, additional management sophistication is required to gain practical understanding of the operation of the system.

Complexity arises from many sources: rapidly changing technologies; new software applications; changes in business models; and geographically dispersed employees. For example, business applications can depend on widely dispersed servers, back-end systems and wide and local area networks. Physical separation increases the dependency on Wide Area Network (WAN) technology, and WAN traffic is growing exponentially and is handled with a large variety of transport methods which must synchronize perfectly in order to receive bits at one point and deliver them reliably to another. Economics can drive provider organizations to place more than one application on a given server, each application having its own traffic rhythms and demands on the processor CPU, memory and I/O subsystems.

Global corporations are becoming ever more dependent upon a continuously available, well behaved suite of applications which underlie electronic commerce (e-commerce). Existing management systems can look backward to show what has happened, or look at the real-time environment, to show what is happening now. The new management capability required will need to examine selected information from multiple sources and vantage points, perform the necessary analyses and, based on these indicators and in conjunction with historical data, predict (in probabilistic terms) when the system is likely to experience performance degradation. Prediction is a new key capability, for it provides time to react and in the best case avoid any user-visible impact.

In the prior art, the state of the distributed system is evaluated based on its response to a stream of work generated by a battery of end-to-end transactions or probes. Such transactions can, for example, open a remote file or data base or send an e-mail message. The present invention refers to the system responsible for system probing as EPP (End-to-end Probe Platform). Every time a transaction is executed, it returns two numbers: the time it took to complete the job and the return code (used to record presence of exception conditions). The key task of system monitoring is to detect unfavorable changes in the state of the system. In the setting of the present invention it would be desirable to predict the future behavior of the EPP transactions, which represent end-user experience. If the predicted behavior is unsatisfactory, the monitoring system would then issue an alarm.

There are a number of tools used to monitor network performance that will collect data from various parts of the network and present the data on charts in real time. U.S. Pat. No. 6,446,123 "Tool for monitoring health of networks" to Ballantine et al. describes a system that predicts fail times of network components and issues alarms if a predicted behavior of a component is unsatisfactory. U.S. Pat. No. 6,359,976 "System and method for monitoring service quality in a communications network" to Kallyanpur et al. describes a system that assigns individual monitors to messages in a network, compiles the results related to individual calls into an historic report of service quality, and issues an alert based on this report. No probing or predictive statistical modeling is implemented.

The concept of probes has also been implemented in a number of settings. For example, the product Dynamic Access Network Performance Manager marketed by 3Com Corp. enables one to obtain real time summaries of the state of various servers, web sites and applications. Another product, Netuitive 5.0, uses the concept of Adaptive Correlation Engine (ACE, as described in U.S. Pat. No. 5,835,902 to Jannarone) to dynamically and continuously correlate the impacts of demand metrics (e.g. hits per second on a web page) and utilization metrics (e.g. percent of CPU utilization) with response time. U.S. Pat. No. 6,446,123 "Tool for monitoring health of networks" to Ballantine et al. describes a system that predicts fail times of network components and issues alarms if a predicted behavior of a component is unsatisfactory. The system does not implement active probing and the alerts it issues are not based on predicted behavior of probes that reflect user experience. U.S. Pat. No. 6,327,620 "Methods and apparatus for collecting, storing, processing and using network traffic data" to Tams et al. uses probes planted to monitor network traffic and introduces table formats to record such data. No state of stations assessment or predictive modeling is used. U.S. Pat. No. 6,363,056 "Low overhead continuous monitoring of network performance" to Beigi et al. describes a system for monitoring a communication network based on selecting every N-th packet of transmitted information, copying it and using it as a probe. Monitoring is implemented based on comparing the number of probes received with the number of probes sent.

A number of other approaches have been described in the prior art. U.S. Pat. No. 6,061,722 to Lipa et al. focuses on communications between a set of clients and a set of servers. The servers send "pings" to clients and use the response time to assess whether the communication paths between clients and servers are clogged. Servers also obtain information on whether a client is running any client-based process not on a list of permitted processes. U.S. Pat. No. 5,822,543 to Dunn et al. also focuses on performance monitoring of communication networks by attaching a "timing script" file to messages sent to network nodes that trigger return messages. The times that the messages take to move from one node to another are used as a basis to judge the network performance. U.S. Pat. No. 6,502,132 "Network monitoring system, monitoring device and monitored device" to Kumano et al. describes a system in which a monitoring device is connected to a plurality of monitored devices that send their status summaries to the monitoring device at the request of the latter. No probing or predictive modeling is implemented.

U.S. Pat. No. 6,574,149 "Network monitoring device" to Kanamaru et al describes a system that contains nodes that send packets of information to neighboring nodes so as to detect whether some nodes have broken away from the system. Here the emphasis is mostly on integrity of the network, not on performance. U.S. Pat. No. 6,470,385 "Network monitoring system, monitored controller and monitoring controller" to Nakashima et al. describes a system in which network devices are connected to a plurality of monitoring stations. This point to multi-point connection passes through a broadcast unit that serves as a branching point of multiple connections and is responsible for transmitting information on status of individual stations toward a plurality of monitoring stations in the system. No probing or predictive statistical modeling is used. U.S. Pat. No. 6,560,611 "Method, apparatus and article of manufacture for a network monitoring system" to Nine et al. describes a system in which tasks are being sent to various nodes in the network to establish whether a problem exists and automatically opening a service ticket against a node with a problem. This system does not use the internal information related to operation of nodes and does not involve predictive modeling. U.S. Pat. No. 6,055,493 "Performance measurement and service quality monitoring system and process for an information system" to Ries et al. discusses a monitoring system that is based on reports that are issued periodically based in indicators obtained via the proposed process of data homogenization. There is no active probing—instead the proposed system uses polling that retrieves status information from network nodes. There is no predictive modeling or automated signal triggering mechanism.

U.S. Pat. No. 6,278,694 "Collecting and reporting monitoring data from remote probes" to Wolf et al. is focused on monitoring network traffic. Here probes are defined as nodes in the network that collect measurements of the traffic flowing through them. U.S. Pat. No. 6,076,113 "Method and system for evaluating user-perceived network performance" to Ramanathan et al. is based on measuring user experience with respect to network throughput; it does not involve computing nodes or predictive modeling. U.S. Pat. No. 5,987,442 "Method and apparatus for learning network behavior to predict future behavior of communications networks" to Lewis et al. involves modeling a network as a state transition graph. The nodes of this graph represent network states and are categorized as "good" or "bad". The system can issue an alert if a state of the graph is predicted as "bad". It does not involve active probing. U.S. Pat. No. 6,587,878 "System, method, and program for measuring performance of network system" to Merriam et al. describes a system that obtains network data and uses this information to estimate performance time of a hypothetical device at a network address.

Prior art focusing on communication (i.e. not computer) networks include U.S. Pat. No. 5,049,873 to Robins et al. and U.S. Pat. No. 6,026,442 to Lewis et al. U.S. Pat. No. 6,070,190 to Reps et al. describes a system of probes for response monitoring and reporting in distributed computer networks; however, the state of the network is assessed based exclusively on probe responses. U.S. Pat. No. 5,542,047 to Armstrong et al. introduces a monitoring system based on circulating a status table. The states of the nodes are recorded in this table and assessed individually. No probing is implemented. U.S. Pat. No. 5,627,766 to Beaven introduces a scheme by which every network node sends test messages to every neighboring node. Injected test messages propagate on their own in the network, and the collection of recorded times is used to determine bottlenecks. U.S. Pat. No. 5,968,124 to Takahashi et al. introduces a system for collection of information produced by sub-networks and, using this information, the current state of the whole network is assessed. Another patent of this type is U.S. Pat. No. 5,432,715 to Shigematsu et al., which discloses a computer system and monitoring method for monitoring a plurality of computers interconnected within a network. Each computer in the network has a self-monitoring unit for monitoring its own computer and acquiring a monitor message, and a transmitting unit for transmitting the monitor message to a monitoring computer. U.S. Pat. No. 6,556,540 "System and method for non-intrusive measurement of quality in a communication network" to Mawhinney et al. is based on transmitting patterns of data from transmitting stations, and analyzing them at receiving stations, detecting distortions in patterns. U.S. Pat. No. 5,974,237 "Communications network monitoring" to Shumer et al. describes a system for monitoring based on data for individual network nodes. No probing or predictive statistical modeling is implemented.

Other prior art focuses on graphical systems for displaying the network status. U.S. Pat. No. 5,768,614 to Takegi et al. discloses a monitored state display unit for a monitoring system which comprises event state information processing means that requests a collecting device to collect event information and gives instructions as to the screen display method according to the state on receipt of the response notification from the collection request or the state change information from the collecting device. U.S. Pat. No. 5,463,775 to DeWitt et al. discloses a graphical resource monitor which depicts, in real time, a data processing system's internal resource utilization. This patent also focuses on reducing impact of data collection activity on performance of the system. U.S. Pat. No. 5,742,819 to Caccavale introduces a system for adjusting server parameters based on workload to improve its performance. Another system of this type is described in U.S. Pat. No. 5,793,753 to Hershey et al., which discloses a system in which programmable probes are sent form a system manager to individual workstations on the network. The probes contain programs that run on the target workstation to establish its state and change its configuration, if needed.

However, none of these prior art approaches produces a predictive model using routinely provided network data responsive to a battery of probes, the battery being designed to reflect user experience, where the object is to predict the future behavior of this battery of probes, with thresholds set in such a manner that false alarms can be limited to a predictably low rate, to anticipate upcoming degradation in the network as measured by future performance of the battery of probes.

SUMMARY OF THE INVENTION

It is therefore an object of the present invention to provide a diagnostic system to use the data generated in a distributed computer network to detect upcoming unfavorable changes in the network as measured by future performance of a battery of probes, the battery being designed to reflect user experience.

It is also an object of the invention to detect an upcoming network degradation in time to take corrective action, even though no problems are visible at the current time.

Another object of the invention is to maintain a pre-specified low rate of false alarms.

Consider a single EPP transaction, performing a particular task representing end-user experience and upon execution returning the time it took to complete the task. It would be helpful to be able to predict its future behavior using transaction data collected up to the present time and, in addition, data collected from other parts of the distributed system, such as servers and routers. The data for servers is typically collected by an Operating System (OS)—for example, UNIX systems typically produce (on a minute-by-minute basis) such quantities as number of kernel threads placed in run queue, number of active virtual memory pages and proportion of idle CPU time. The data for routers may include quantities such as the number of outgoing packets, the number of incoming packets or percent of CPU Utilization. Finally, some variables related to performance or demand for specific applications based on the server can also be included in the model.

The modeling problem can be formulated as follows. One is interested in predicting what the transaction time will be at some time in the future. The time between the present time and this time in the future will be called the "prediction horizon." Determination of a suitable prediction horizon depends on a trade-off between (a) the ability to take timely corrective actions in response to an alarm and (b) prediction accuracy for the selected prediction horizon. The longer the prediction horizon, the more time will be available to respond with effective corrective action but the larger will be the percentage of false alarms, i.e. the "corrective" action is unnecessary. It is therefore important to have enough time to take corrective action before the problem becomes evident to the user, but not so much time that the network is burdened with unnecessary corrective measures. For example, one could choose a prediction horizon to be the minimal time period for which the alarm is practically useful, and then determine what is the corresponding rate of false alarms. Alternatively, one could determine an acceptable rate of false alarms, and then determine whether the corresponding prediction horizon is practically useful. In either case the methodology of the invention allows determination of a suitable balance between prediction horizon and false alarm rate by trial and error.

A large number of predictive modeling techniques are available in the statistics literature. The present invention focuses on a specific technique called the Generalized Additive Models (GAM), as described by T. J. Hastie and R. J. Tibshirani in *Generalized Additive Models* (Chapman and Hall, 1990), hereafter "H&T1990". This technique enables one to discover and describe the functional dependency of the expected value of the response (e.g. the values returned by EPP probes) in terms of predictor variables (e.g. other EPP probe values and network node data). Additive models are not new, but have been developed over the last ten or fifteen years. They provide a methodology—a largely automated methodology—for analysis of data, in this case the dependence of the expected value of a probe response on available predictor variables. The notion of an additive model—that is, the analysis is limited to the linear sum of variables—is made more powerful by allowing variables to be replaced in the linear sum by transformations of the variables, where the most useful transformation of a particular variable is determined automatically by operation of the additive model technique itself. What the present invention has discovered is that by restricting analysis to additive models—which place a reduced computational burden on the system, in contrast to more accurate but more complex analytical techniques—useful results can be obtained, i.e. a workable prediction horizon coupled with a low rate of false alarms. It is this which the inventors claim is new and non-obvious.

According to the invention, there is provided a diagnostic system in which, at every point in time, a forecast is made of the future probe response times. The forecast is made using a model containing certain of the available predictor variables. The model used for the forecast is developed prior to its use for forecasting (i.e. the model is "pre-computed") through an iterative procedure which uses a statistical evaluation of available predictor variables to determine which parameters to include in the model. If the forecasts using this model exceed certain thresholds, an alarm is triggered. Following an alarm, the system performs a diagnosis to identify the causes of the upcoming problem.

A fixed segment of data produced by the battery of EPP probes and network nodes is used to construct a predictive model (PM). This model enables one to predict future values of EPP probes based on the data recorded up to the present point in time. The prediction is formulated in terms of a conditional probability distribution of the future values of EPP probes given the EPP and node data up to the present. Thus, the model enables one to provide the point estimates for the future EPP values, to compute error bars (confidence intervals) and also to establish criteria for triggering an alarm, as will be described below.

Criteria for triggering an alarm are formulated in terms of the distribution of future EPP values. Specifically, a threshold for the future EPP value is set; if the estimated probability of exceeding this value is too high, an alarm signal will be triggered. Thus, the procedure establishes an acceptable operating window for the distribution characteristics (for example, quantiles) of future EPP values. An alarm triggered when the distribution characteristics remain within this operating window is called "false"; the decision parameters are selected so that the rate of such false alarms is at some pre-specified low level. The procedure also specifies what attributes make the distribution characteristics unacceptable, indicating that a new model must be developed. Tools are provided to test that the speed of detection of such unacceptable conditions is satisfactory.

In the operational phase, distribution of future EPP values is evaluated, and if this distribution does not satisfy pre-specified criteria for goodness, an alarm is triggered. Following an alarm, a diagnostic procedure is activated to pinpoint the root cause of the alarm and suggest corrective actions. Some information on the root cause will come from PM itself; additional information can be obtained via a secondary battery of probes that serves exclusively diagnostic purposes. The corrective actions can then be implemented via manual intervention or an automated corrective system.

A procedure is given to re-start the monitoring process after a corrective action has taken place or after events that introduce changes to the system warrant such re-initiation. This procedure is necessitated by the fact that some of the lagged variables in the PM derived in the initial phase might correspond to the old state of the system while the subsequent variables correspond to the new state.

A procedure is given to monitor the adequacy of the current PM in order to detect presence of new conditions and variables that might render it irrelevant. Once an alarm indicating model inadequacy is issued, the model has to be rebuilt.

The solution provided by the present invention differs from the prior art in that it uses the theory of Generalized Additive Models (GAM) to build a predictive model based on a combination of a) data normally generated by network nodes, b) results of a battery of probes and c) profile curves reflecting expected (i.e. based on recent history) response times corresponding to this battery for various times of the day, days of the week, month of the year, etc. A model is pre-computed and, unlike in some other approaches (e.g. U.S. Pat. No. 5,835,902 to Jannarone), it does not have to be dynamically adjusted, resulting in fast operation and low overhead. The only times that adjustments are made to a model is when a separate process, designed to monitor the model adequacy, triggers an alarm. The variables that are included in the model are selected based on the standard theory of GAM. In the course of normal operation, the model produces, at regular intervals, forecasts for outcomes of various EPP probes for various horizons of interest; also, it produces thresholds for the respective forecasts based on a number of factors, including acceptable rate of false alarms, forecast variance and EPP values that are expected based on the recorded history. As a result, the system is capable of maintaining a pre-specified low rate of false alarms that could normally cause a substantial disturbance in network operation. Following an alarm, the system provides an automatic diagnosis in terms of the elements of the underlying predictive model.

In the practice of the invention, there is introduced the criteria for network performance that are based on response time results expected from the battery of probes. To this end, the present invention derives profile curves reflecting expected (i.e. based on recent history) response times corresponding to this battery for various times of day, days of the week, month or year, etc. Performance of the network is generally measured relative to these curves.

The present invention derives an additive model that predicts the behavior of a suitable function of each probe at some future point in time (e.g., 15 minutes later) in terms of the data at hand. This data consists of measurements routinely provided by the nodes of the network, and results of current and previous probes. The method provided enables one to select the most suitable normalized (i.e., having a variance value of 1) function of a probe and then to obtain a predictive model for this function involving a minimal number of variables. This is achieved by using advanced statistical methods, some known (e.g., classification and regression trees) and some new.

The method for selecting alarm thresholds according to the invention assures a predictably low rate of false alarms. The thresholds will generally depend on factors such as time of day and day of the week, and on the standard deviation of the probe response time forecast. Data is collected in real time, using a pre-computed forecasting model to produce forecasts of future probe response times. Alarms are triggered based on thresholds that are mostly pre-computed, with adjustments based on standard deviation of forecasts made in real time. Following an alarm, the invention produces a graphical summary that enables the user to identify the cause of a problem. In some cases, the system could respond automatically to an alarm, e.g., by allocating more resources to a weak spot in the network. The invention also provides an automated diagnosis in terms of the components of the underlying predictive model. Furthermore, the invention is capable of maintaining a low rate of false alarms, below a level that would otherwise cause a substantial disturbance in network operation.

The system also monitors the degree of fit between the pre-computed model and the incoming data and produces an additional and different alarm if the model stops being adequate. Following a change in the network, the system provides a way to restart the monitoring process by using similarly derived additive models that take into account only the data that corresponds to the post-change state of the network.

The subject invention differs from the prior art in its use of advanced statistical methodology to build a predictive model based on a combination of data normally generated by network nodes, results of a battery of probes and profile curves reflecting expected (e.g., based on recent history) response times corresponding to this battery of various times of day, days of the week, month or year. Thus, the invention is capable of detecting an upcoming network problem even though there are no visible problems at the current point in time. The invention enables one to see, for example, an upcoming problem on a given server from the data recorded at a different node, such as a local area network (LAN) router. It also enables one to detect the presence of longer term trends in the data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
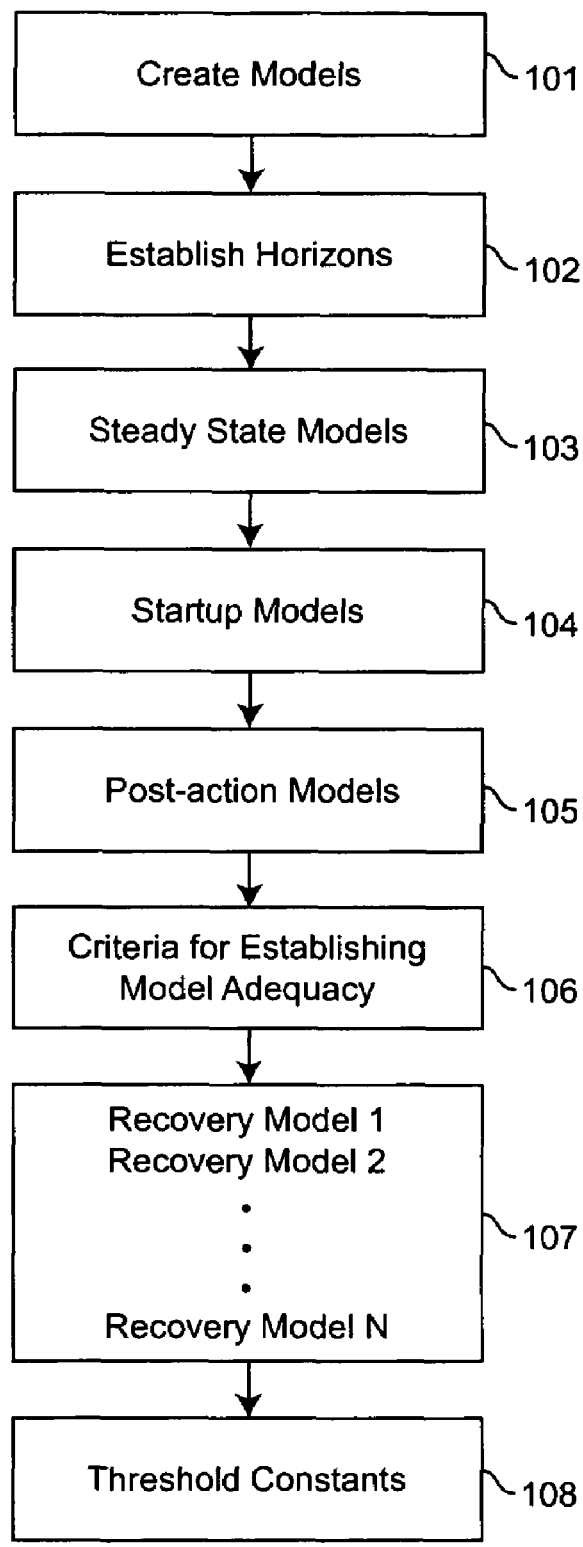
FIG. 1 is a flow chart showing the design phase for generating a model in accordance with the invention.

Referring now to the drawings, and more particularly to FIG. 1, there is shown a flow chart for design of a predictive model. In module 101 there are created the statistical models (derived by using GAM's) that connect the EPP characteristics and the predictors. Module 102 establishes the prediction horizons for various EPP probes. This requires coordination with module 101, so as to make sure that the horizons are realistic (i.e., the model is capable of predicting for this horizon). In module 103 the Steady State models are derived: these are full scale models that use historic data so as to maximize predictive capability; it is assumed that the relevant data could be obtained from any depth in history. Module 104 deals with the derivation of Startup models: these are used when the amount of historic information is limited. For example, because of a server re-start 0.5 hours ago, the historic server data that is more than 0.5 hours old is considered irrelevant and is not permitted to play a role in a model. A rich enough collection of the start-up models is pre-specified so as to enable one to judge what data behavior can be considered normal or abnormal for a given start-up phase. These models are capable of predicting future EPP values for various horizons of interest. Start-up models are needed in order to take properly into account transient phenomena typically observed under the start-up conditions.

Module 105 specifies a class of post-action models that are used in the wake of a specific action taken by a system or operator, e.g. in response to an alarm. For example, a decision to bring an additional server capacity on-line could necessitate a switch to a start-up model. Note that the current model could remain fully relevant even after some corrective actions: for example, re-direction of a queue from one server to another could result in new traffic/EPP characteristics that have no impact on the predictive ability of the model; however, one may need to reduce the weight of some previously observed variables, e.g. previous EPP values.

In module 106 criteria for establishing model adequacy are specified. These are implemented in terms of statistical goodness-of-fit tests; for example, some of the tests are based on the residuals from the model. These criteria are used in the run-time phase to establish that the behavior of data is in line with the current model.

In module 107 recovery models are derived. These models are used when the on-line tests for model adequacy signal that the model under which current predictions are made is no longer supported by the data. A battery of such recovery models is pre-derived: choice of one to be used in the recovery process depends on the type of a model "goodness of fit" test violation. If none of the recovery models from the battery fit the recent data, an alert is issued. Subsequent off-line analysis of the data is needed in order to decide whether to consider this situation as anomaly, or whether to supplement the battery of recovery models with additional ones, that are appropriate for the observed situation.

In Module 108 we derive the constants and curves that are needed to derive a threshold under run-time conditions, i.e., $C_0$, $C_1$ (t), $C_2$. As indicated in (1), the threshold itself will depend on the estimated standard deviation of the forecast, $\sigma(EPP)$.

Figure 2:
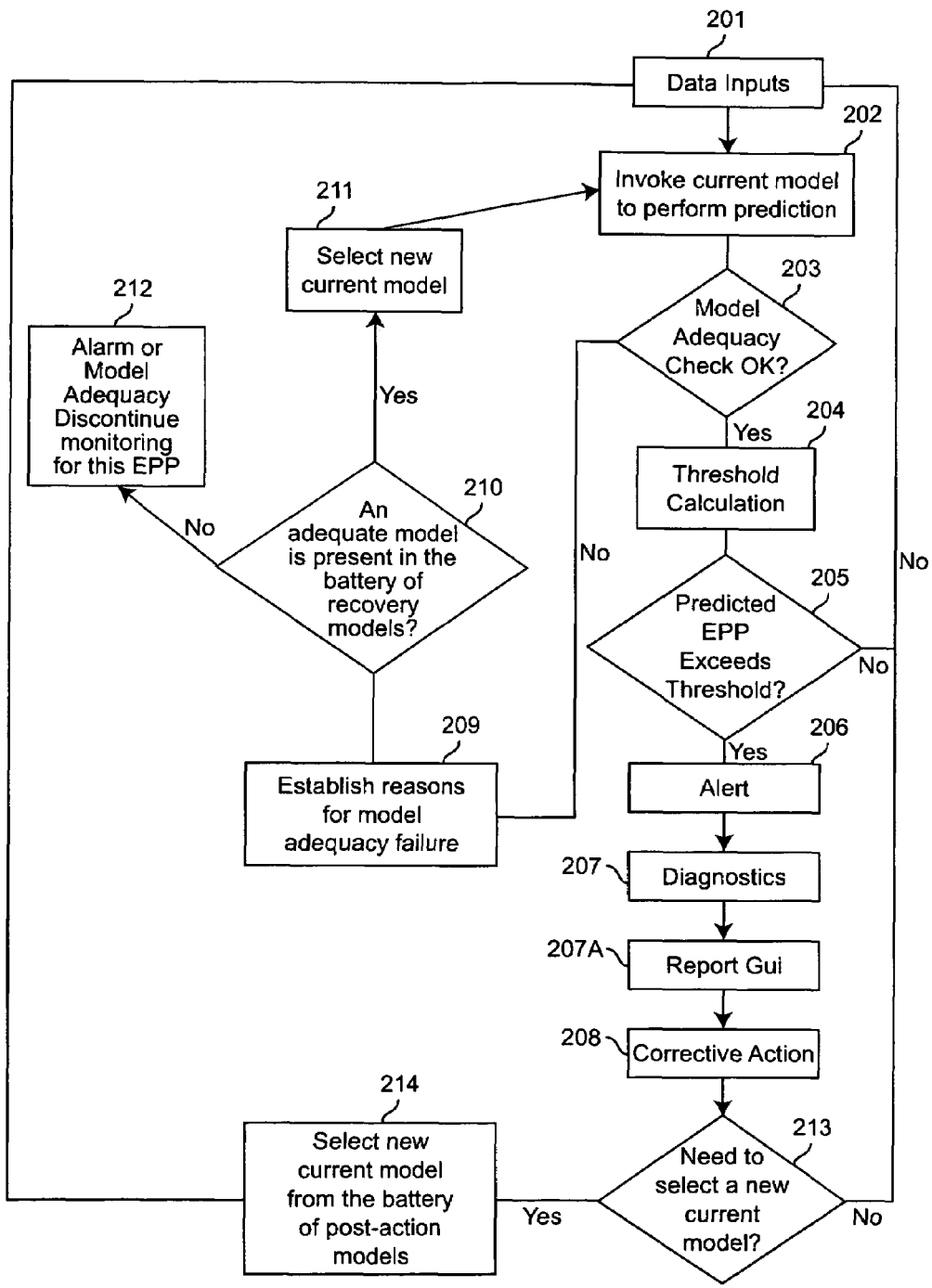
FIG. 2 is a flow chart showing operation of the invention at run time.

FIG. 2 describes the run-time operation of the invention. Module 201 is responsible for collecting data inputs from servers, routers and EPP probes. Module 202 invokes the currently active prediction model (which is initially taken from a start-up battery, and, after some warm-up period switches to a steady state model), and predicts relevant values of various EPP probes, also providing estimates of forecast accuracy, $\sigma(EPP)$. Module 203 performs goodness-of-fit tests for model adequacy. If model is found to be adequate, then Module 204 will calculate the thresholds that will be compared with the predicted values of the EPP's so as to decide whether to trigger an alarm.

If the model adequacy test fails, a diagnostics procedure is invoke to establish reasons for model failure (209), and a search for the new adequate model is performed (210). If an adequate model is found, it is established as the current model (211) and the monitoring process is resumed; otherwise, we have no suitable model and we cannot continue monitoring this EPP. Subsequent off-line analysis is needed, as described above.

After a threshold calculation (204), the predicted EPP value is compared against the threshold (205). If the threshold is exceeded for the horizon of interest, an alert is issued (206) and a diagnostic procedure is performed (207) to establish suitable corrective actions (208). A report on the alert is issued and displayed via a Graphical User Interface (GUI), in (207A).

After corrective action, one needs to establish whether the current model remains relevant (213). If not, then a suitable model from a post-action battery needs to be selected (214), and the data collection and monitoring process is resumed.

The data produced by the battery of EPP probes are collected in a database which is updated in real time. Similar databases are maintained for each of the K network nodes (e.g. servers and routers) in the system. To create a predictive model (PM), these data bases are consolidated into a single model matrix. For every observed EPP response time there corresponds a row in the model matrix. For example, if the EPP response time Y was observed at time t and the prediction horizon for this probe is h then the row will contain

Y t

Most recent data for network node #1 observed on or prior to time t-h

Most recent data for network node #2 observed on or prior to time t-h

. . .

Most recent data for network node #K observed on or prior to time t-h

We note that the lagged data are also included as part of the most recent data. We will see that the employed methodology allows us to base our predictions on the history data up to time t-h which include several most recent collection times, all prior to t-h.

We also note that predictions may be required for several horizons h. In this case a separate PM will be developed for each such horizon.

Figure 3:
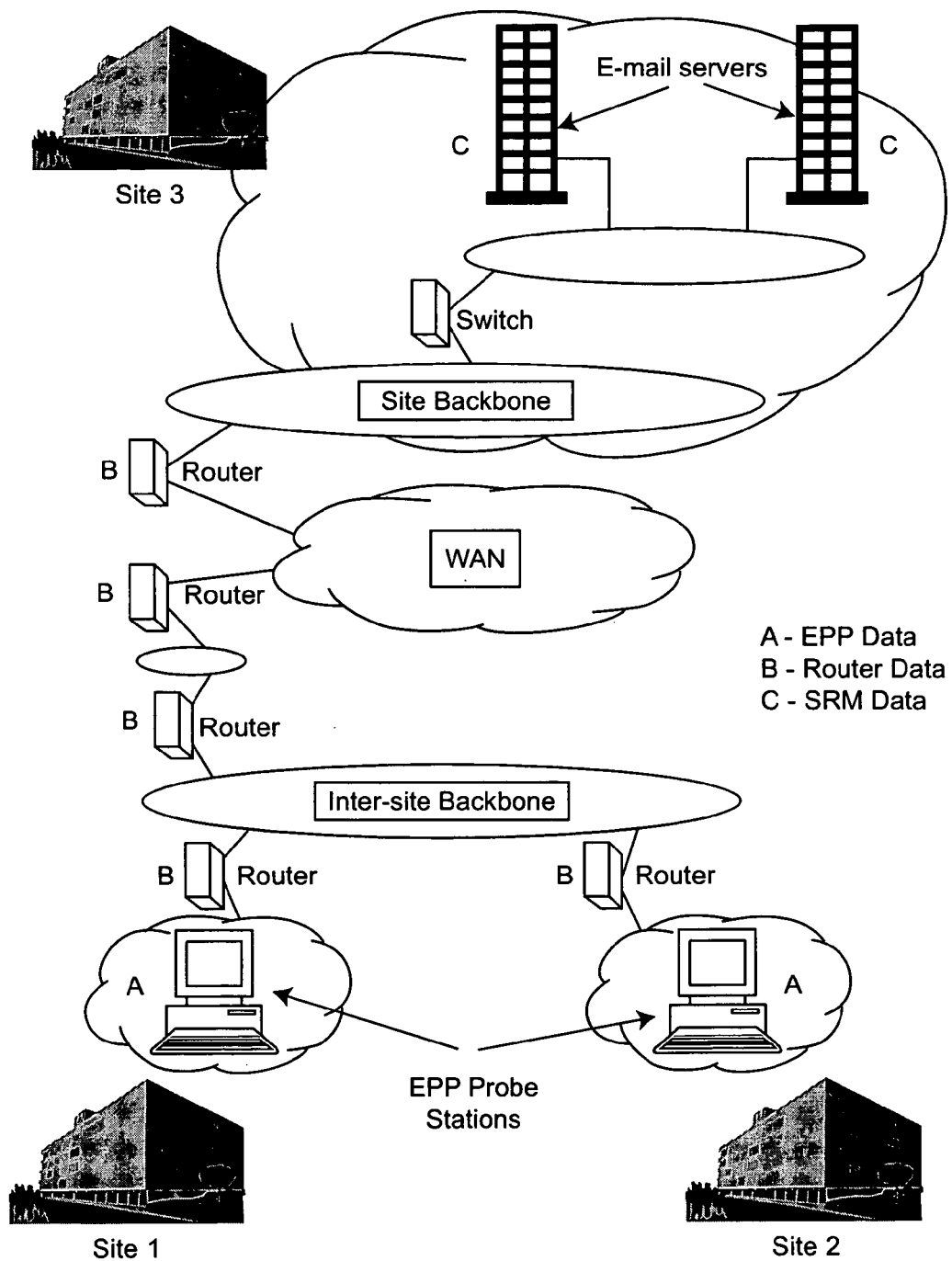
FIG. 3 is a schematic showing the layout for the distributed environment within which the invention operates, showing the main sources of data in accordance with the prior art.

To obtain a PM, in the first step we carry out dimensionality reduction. As can be seen, we are collecting data from all relevant network nodes (see prior art FIG. 3) and a battery of EPP stations. We expect to see rather few of these variables to account for much of the predictive capability of these data. Also, the variables may be different for different probes. In addition, fitting a complicated model requires a lot of resources allocated from the system, but under this expectation, most of these resources will be wasted. Also, more complicated models are in general less stable to the presence of outliers and unsystematic data (noise). Thus, obtaining greater insight into the situation is of great importance for such involved models. Thus, we propose to start with a simpler model for the initial step in dimensionality reduction based on its greater stability and computational tractability. This will be done for each EPP probe separately.

We first carry out Frobenius stepwise linear regression (SLR) (as described by A. J. Miller in "Selection of subsets of regression variables" in *Journal Royal Statistical Society*, Series A 147 (1984), pp. 389–425). It starts with a null model. At each step it checks if any of the predictor variables is significant, and if so, it adds the most significant variable to the model. It then checks if any of the variables already in the model is not significant anymore, and in this case, it deletes the least significant variable from the model. The significance statistic is a standard F test based on the analysis of variance. The procedure continues until no addition or deletion step is significant.

Having carried out this procedure, we obtain a list of models, one corresponding to each step of the SLR. Our interest in choosing a model is only insofar as it gives us a subset of variables to be further considered for the PM. We pick the subset of variables which enter into the final model chosen by SLR. We also propose to control the number of variables chosen on the basis of the SLR computation. Two ways of doing that are suggested. First, we modify the F statistic used by SLR to come up with the appropriate extent of dimensionality reduction. The greater is the critical F value, the harder it becomes to add new variables and the easier to delete, so the smaller will be the final model. The second way involves just one run of the SLR with a relatively small critical F value. We then choose the model with the pre-specified number of variables. This method is particularly useful for integrating SLR with a more involved modeling technique whose stability and complexity characteristics are known which allow us to pre-specify a number of parameters. Such was the case for additive modeling (AM) (as described by T. J. Hastie and R. J. Tibshirani in "Generalized Additive Models" in *Statistical Science* 1, (1986), pp. 297–318) to which we now turn. Our experience suggests choosing between 30 and 40 variables.

After the least significant variables have been removed from the model matrix by the above procedure, the dimensionality is further reduced by a partial stepwise additive procedure. Note that, in general, AM is a model which fits a sum of additive functions $\Sigma_i f_i(X_i)$ of the predictors $X_i$ to the mean of the response. Fitting the AM means identifying functions $f_i$. The number of variables retained can still be computationally too hard to be handled by a stepwise additive procedure described in H&T1990. Instead, suggested is the following. First, fit an AM to the remaining variables. Use the default degrees of freedom for smoothing each variable prescribed by the back fitting algorithm used to fit the AM. For each variable, compute the F statistic based on the analysis of deviance for the removal of that variable. Let B denote a subset of the least significant variables. The size of the subset is chosen to make the implementation computationally easy. Stepwise additive procedure is performed by fixing the rest of the variables $B^c$ at their default/already established df and prescribing a regimen of possible df for each variable in B. Such regimens usually include the present df, a linear term, and the choice of leaving the variable out of the model. The result of the partial additive procedure is used to update the AM, which is refitted and new subset B is identified. The procedure is repeated until all variables have been in B.

At this point we expect to have retained a small number of variables. We suggest to check for univariate and bivariate outliers as they may have a strong effect on the fitted functions $f_i$ of the AM. If the apparent influence of outliers is indeed strong as suggested by the tangible change in functional shapes, standard stepwise additive procedure may be applied after their removal to assess more accurately the degrees of smoothing (equivalently, df) suggested by the data. Alternatively, adaptive back fitting (BRUTO) (H&T1990) may be applied to the same end.

Now, we determine the scale of the response (EPP probe values) which we have greatest power predicting. Two standard techniques are Alternating Conditional Expectations (ACE) (see L. Breiman and J. H. Friedman "Estimating optimal transformations for multiple regression and correlation" in *Journal of the American Statistical Association* 80 (1985), pp. 580–619) and Additivity and Variance Stabilization (AVAS) (see Tibshirani "Estimating Optimal Transformations for Regression via Additivity and Variance Stabilization" in *Journal of the American Statistical Association* 83 (1988), pp. 394–405). The former finds a function of the response and an additive function of the predictor variables which have greatest correlation. The latter stabilizes the variance of the response (as a function of its mean). The AVAS also produces a monotone function of the response, which helps to interpret the results.

So far we have identified function of the response θ, the important predictor variables $X_i$, $1 \leq i \leq k$, and functions of predictor variables $f_i$, $1 \leq i \leq k$ to fit the additive model $$E[\theta(Y)|X_i, 1 \leq i \leq k] = \Sigma_i f_i(X_i)$$

or, equivalently, $$\theta(Y) = \Sigma_i f_i(X_i).$$

The AM, especially coupled with the ACE or AVAS, provides more generality than a linear model, and thus the fit is expected to be better. The limitation of the AM is that as it has been so far developed, it does not take into account terms which involve more than one predictor variable, the interaction terms. We propose the following steps to determine, if any, significant interaction terms.

We use a regression tree fitting procedure named CART (Classification and Regression Trees), as described in L. Breiman et al. *Classification and Regression Trees*, Wadsworth International Group, Belmont Calif. (1984) to fit the regression tree to the $X_i$. We control the growth of the tree by pruning it to have a pre specified number of leaves. Typically, we would like to have a tree of diameter no more than three to limit us to three-way interaction terms. The variables that define the path to the leaf are then fitted as an interaction term in the AM. It has also sometimes advantages to consider only two-way interactions even with trees of diameter three. In this case one can restrict the back fitting algorithm to using only the terms in the corresponding branch of the tree from the root. We also mention that in addition to this method, Multivariate Adaptive Regression Splines (MARS) method (as described in J. H. Friedman, "Multivariate Adaptive Regression Splines" in *Annals of Statistics*, 1991, vol. 19, beginning at page 1) has proven useful in detecting interactions.

Tree methodology is also useful to check for missed interaction terms after the model is fitted. To this end, a tree is fitted to the residuals.

Finally, we propose to take into account seasonality effects as follows. Clearly, when we talk about deviation in EPP probe data, we mean deviation from their normal behavior. We propose to define their "normal behavior" as a function of the time of the day, of the day of the week, and also pick out any apparent long term trend. We will later explain how to use this function in establishing the significance of deviation when making predictions.

The seasonality effects are estimated by applying the following modification of the Seasonality Trend Decomposition Using LOESS Procedure (STL), as described in R. B. Cleveland, et al., "A Seasonal-Trend Decomposition Procedure Based on LOESS" in *Journal of Official Statistics*, vol. 6, pp. 3–73 (1990). The idea is as follows. We assume that there are three basic systematic components in the behavior of the probes as the time progresses. First, there may be a long term trend accounting for the change from one week to the next. Consecutive weeks are thought to be similar to each other in principle because this reflects periodicity in the habits of users as well as that of the majority of scheduled maintenance jobs. We realize however that things gradually change over time, presumably in a smooth fashion, and we are interested in capturing this trend if any.

Second, there recognized the effect of the time of the day. It has long been known that there are peaks of user activity in the late morning and in the afternoon, while the load tends to be low in early morning and in the late evening. At night, the user load is minimal, but some system resources are employed by maintenance procedures.

Third, the situation differs from one day to another. While the basic average shapes of the EPP probe value curves are expected to be qualitatively similar, the end of the day behavior starts earlier on Fridays, and maintenance jobs are not as demanding after the weekend, for example.

These three components call for the following smoothing technique using the back fitting algorithm. We have $$Y_t = T_t + D_t + H_t + R_t,$$

where $Y_t$ is the EPP value at time t (on θ-scale), $T_t$, $D_t$, and $H_t$ are its trend, day and hour components respectively, and $R_t$ is the remainder term. First, smoother $S_H$ is applied to capture the time of the day effect. This is accomplished by specifying the bandwidth for $S_H$ so as to make it sensitive to changes occurring on an hourly scale. Next, smoother $S_D$ is applied (to the partial residuals from fitting smoother $S_H$ for each day separately. Thus, $S_D$ stands in fact for five (which is the number of weekdays) or seven separate smoothers whose results are then recomposed. Finally, a trend smoother $S_T$ or a low-pass filter is applied (to the partial residuals from $S_D S_H$) to account for a long term trend as in the STL. The trend smoother is characterized by a bandwidth which makes it sensitive to week scale changes, but not to day scale changes. The steps are then iterated by the back fitting algorithm. Thus, the next step is to apply $S_H$ to the partial residuals from $S_T S_H$ of the previous iteration. At convergence, we obtain curves $T_t$, $D_t$ and $H_t$ that define the trend, the effect of the day, and the effect of the time of the day alone. The trend component is used to predict normal (average) behavior weeks into the future. This is interpreted as estimating the probe value average if the current events concerning the system continue. It will probably be up to the maintenance crew to correct the system so that it does not exhibit a substantial trend. On the other hand, the curve $$C_1(t) = D_t + H_t$$

describes seasonal change of expectations and thus defines the normal behavior of the probes as we required. This curve is used by the control scheme described below.

We also note that certain systems may not exhibit dependency on either the time of the day alone, in a sense that the day effects do not follow a common trend and thus, should be described separately with $T_t$ omitted, or the day of the week, in that the days behave so much alike that $D_t$ effects are negligible. In either event, we just drop the corresponding smoother from the back fitting loop. The two possibilities can be tested by comparing the ranges of the $H_t$ curve and the $D_t$ day curves.

We have described the building of the predictive model. We now show how to use this model to fulfill the goals we have set. We have required producing inferences in real time. In our application, we have chosen minute by minute predictions. We note that not all the data are collected minute by minute or on the same interval scale. For example, a given EPP probe can be sent every 10 min, the server data can be sampled every minute and data from routers can be obtained at 5 minute intervals. In the instances where the new data from a given probe or node do not arrive, they are filled with the most recent corresponding observation available. These predictor data are entered into the PM to produce inferences for the moment in time which is h time units into the future. The output of the PM includes:

a. The estimated mean $E(\theta(EPP)) = \Sigma_i f_i(X_i)$ of a given future EPP probe value (on θ-scale).

b. The estimated variance σ(EPP) of the estimate in a.

c. The estimated variances $\sigma_i$ of the estimated contributions $f_i(X_i)$ of each predictor variable i.

The first two are used as inputs for the proposed control scheme. (The third is used later for diagnostics.) The purpose of the scheme is issuing alarms of an unhealthy state of a network as well as self monitoring with respect to false alarm and missed alarm rates as explained below.

In the course of application of a control scheme, for every forecasted value of EPP an alarm threshold C will be computed; if the forecast EPP exceeds C an out of control signal is triggered. For example, consider the situation where a forecast EPP for a probe response at time t is produced at the time t-h; then the alarm threshold can be computed via formula $$C = C_0 + C_1(t) + C_2 * \sigma(EPP) \qquad (1)$$

where $C_0$ is a constant part of the threshold, $C_1(t)$ is the part that depends on the time of the day and the day of the week as explained above, σ(EPP) is the estimated standard deviation of EPP and $C_2$ is the multiplicative constant. The curve $C_1(t)$ is pre-computed based on historic data reflecting prevalent EPP values for various days of the week, times of the day, etc. The last term of Equation (1) shows how the increased variance of the forecast causes elevation in the signal threshold; in principle, however, once can get a somewhat simpler threshold by selecting $C_2 = 0$.

To derive a control scheme for a given EPP probe (i.e., to select the coefficients in Equation (1) that determine the threshold C), we first note that the parameter $C_2$ will generally be pre-selected (based on accumulated experience of applying this type of procedure, and it will generally not change much from one procedure to another (a good starting point may be an appropriate (e.g. 95th) percentile of the standard normal distribution). The key is therefore to select the constant $C_0$ high enough so as to assure a low rate of false alarms. This is done by applying the control scheme to the initial (learning) data in the following way.

First of all we define the concepts of "false alarm" and "missed alarm". To this end, we select two zone thresholds, both taking into account the seasonality, $$U(t) = U_0 + C_1(t) \text{ (upper) and}$$

$$L(t) = L_0 + C_1(t) \text{ (lower).}$$

The EPP responses below L(t) will be called "good" and responses above U(t) will be called "bad". If a signal is triggered and the subsequently observed corresponding value of the EPP probe falls below L(t), the signal will be called a false alarm. If a signal is not triggered and the subsequently observed value of the EPP probe will fall above U(t), the event will be called a missed alarm.

Now the learning data (EPP responses) is subdivided into three non-contiguous parts: "good", "bad" or "grey", depending on whether the responses fall below L(t), above U(t), or between L(t) and U(t). Now we apply a control scheme to the learning data and focus on the "good" part of the data. We record the number of false alarms issued in this part of the data; the ratio of this number to the total time corresponding to the "good" state of the process is called the rate of false alarms. We will pick $C_0$ high enough so that this rate is acceptably low.

Next we apply a control scheme to the learning data and focus on the "bad" part of the data. We record the number of alarms issued in this part of the data; the ratio of this number to the total time corresponding to the "bad" state of the process is called the rate of missed alarms. If this rate is acceptable, based on the learning data, we accept the parameters of the control scheme. Otherwise, we will adjust $C_0$ downwards, gaining more sensitivity at the expense of increasing somewhat the rate of false alarms.

We now describe the procedure of restarting the model once an alarm has been issued and an action taken. Taking an action may cause part or all of history data to become irrelevant. For example, if a set of server jobs has been moved to a different server, the fact that the server had a large queue a minute ago has no implication for its present behavior. Also, using past EPP values may be questionable under changing conditions. We have seen above that we are substituting most recently seen data for the predictor variables of the model in the prediction step. Thus, we have to provide a prediction method when only part of the data are unavailable (meaning irrelevant).

We have two ways of handling this problem. The more straightforward method is imputation of missing data. It is particularly simple in the case of an additive model because due to its construction, the imputed value is zero. Thus, for example, if set B of prediction variables is available, the prediction value is $$\Sigma_{i \in B} f_i(X_i)$$

Such a solution is appealing due to its simplicity. However, here lies a potential problem. The PM was developed under the assumption that all variables are available. Some may have been taken out of consideration, not because they did not have any predictive value, but because other variables were good proxies for them. Now, without these variables available, we find that they should be retained. Also, interaction terms for missing variables would be dropped from the model instead of substituting them with different interaction terms.

Other problems exist. Thus, it is better to have shortened versions of the PM, ones which include lagged data only up to a certain time into the past, including as a special case of the absence of all the data from a given node. As the time passes after an action was taken and the data collected under the new circumstances become available, we will switch to a fuller model and continue switching until we have all the variables that enter the PM available. The shortened models may be developed using the same methodology as that described above. An intermediate option between the two alternatives is to develop just a few models and to use the short one with a few imputed values until a host of other variables becomes available to warrant a switch to a fuller one, again with some imputed values there.

Last, we outline the user interface. For each EPP probe and each time horizon there will be displayed the predicted EPP probe value with its error bars, the computed threshold C, and an alarm that may be issued by the control scheme. Also, a diagnostic table is constructed. Its purpose is to help to determine what predictor variables account for most of the contribution into the probe value according to the model. Thus, if, for example, it occurs that the server virtual memory term accounts for most of the deviation of the predicted future EPP probe value from its normal curve and an alarm is issued, this will pinpoint that the problem which the alarm anticipates is, obviously, the lack of available server memory, and may guide the server maintenance personnel to begin to take action before the state of the server actually causes problems in the network. The table has four columns. The rows of the table correspond to the model predictor variables. For each variable I, the first column entry is its most recently observed value $X_i$, the second column entry is its contribution $f_i(X_i)$ to the predicted future EPP probe value (on θ-scale), the third column entry is a graphic representation in the form of a partially filled bar whose length is the predicted EPP and whose fill is the contribution of variable I, and finally, the fourth column entry is the P-value of observing $X_i$ under "good" conditions. The later is defined as the probability of observing a more extreme value than the one that was actually observed. If this probability is small (e.g. less than 5%), the observation is called significant, i.e. is interpreted as being too extreme to be observed under "good" conditions and thus, being evidence that the conditions are not "good". The necessary error bars for computing this P-value are provided by the model output (c), for the estimated variances $\sigma_i$, as discussed above.

The operation of an implementation of the invention will now be described. First, initialize θ. Then apply stepwise linear regression of θ(Y) on the predictor set to dispose of the least valuable terms of the measurement set. A regimen of possible degrees of freedom with which each term enters the model is specified. The degrees of freedom control the degree of non-linearity permitted for the term. The full additive model includes a complete set of predictor variables and, following Hastie and Tibshirani (1986), is fitted and a partial stepwise additive regression is performed on the least statistically significant predictor subset, as determined by the F statistic of the fitted model. This procedure selects one value for the degrees of freedom out of the value regimen for each term in the subset based on a deviance criterion, such as Akaike Information Criterion (Akaike). Next, the resultant model is refitted to the data, the least significant subset of the retained predictors is determined again and so forth until all the remaining variables are significant.

We mention in passing that other model selection techniques may be used for choosing the appropriate predictor variables, such as adaptive regression splines (known in the trade by the acronym TURBO) or adaptive back fitting (known in the trade by the acronym BRUTO).

We now mention another way to determine the appropriate predictor variables and especially their significant interactions. We fit a regression tree to the data with a small number of leaves, in the range of ten to twenty leaves. Important predictors are indicated by the reduction in deviance after a split along the corresponding axis. Important interactions are indicated by the reduction in deviance after consecutive splits, i.e. a path along branches in a tree. In addition, multi variate adaptive regression splines can be used for determining significant interactions. Next, the Adaptivity and Variance Stabilization (AVAS) procedure is applied using the retained variables with the current degrees of freedom. This will provide a function of future EPP values, θ, with maximized predictive power as mentioned earlier.

The foregoing model selection procedure is repeated for the current function θ of future EPP values. The need for iterating is due to the fact that the variable selection process is carried out for the current function θ and may no longer be correct after θ changes.

We now provide commentary regarding particular aspects of the invention:

Removal of Out-of-range Data or Outliers

Due to the operational difficulties of obtaining data from a production environment, data values may be sparse for a particular range for some predictor variables. The designer may elect to remove the corresponding data points the first time the model is fitted, or when a problem becomes apparent as indicated by increase in variance for the corresponding fitted function in that range.

Profile Curves

Profile curves are defined to account for any observed regularities in the normal variation of data. For example, profile curves explain the expected variation in EPP probe values Y with the time of the day and the day of the week. It is important to point out that these expected variations are those actually observed in the already recorded data. Y is decomposed as the sum of a long term trend effect, a day effect, a time of the day effect (to the extent that regularities coupled statistically with a long term trend or weekly or daily cycles are evident in the data) and a remainder term. First, Y is smoothed against the time of the day. The obtained smooth is subtracted from Y creating the partial residual that is smoothed against time for each day separately. The partial residual from both smooths is smoothed against the week defining the trend. The partial residual from the day and the trend smooths is again smoothed against the time of the day and so forth. Thus, the procedure is the back fitting algorithms for the three smoothers defined above.

Detect Favorable and Unfavorable States

A control scheme is provided which is a monitoring tool for the EPP process based on the developed model. The method is described to compute a threshold. An alarm will be issued whenever the predicted value given by the predictive model (PM) exceeds the threshold. Three key features of this threshold computation method are:

(A) The threshold incorporates variance information computed by the model. An alarm will only be issued if the prediction is reliable enough. Even when the formal predicted value is above a would-be threshold, if its estimated variance is too great, an alarm will be suppressed. This helps to control the rate of false alarms.

(B) The threshold uses the profile curve to take into account seasonality perturbations and other regularities in the variation of data. For the same prediction the situation may be considered abnormal if observed during, say, quiet hours (e.g. 10 pm) and not so abnormal if around noon when network traffic is expected to be high.

(C) The computation of the threshold may be adapted to control the rate of false alarm (at the expense of control sensitivity) by vertically shifting the variance-seasonality curve based on the learning data.

Following an alarm, those predictors or set of predictors which are unfavorable are identified. The model is used to show the estimated contributions of each predictor to the future EPP value estimate. These contributions determine what variable(s) is (are) responsible for an alarm, if any. This information is useful for pinpointing the problem in the network and when used over a long run, identifying recurrent bottlenecks. Then there is displayed a graphical representation of the state and contributing components.

In the user interface, for each probe and each time horizon, the following are included:

(A) Predicted value together with its error bars (B) The computed threshold and whether an alarm is issued (C) For each predictor variable $X_i$ or an interaction term, its contribution to the predicted value $f(X_i)$ together with its error bars and the associated p-value that this contribution is greater than zero, its nominal expected level.

Reset Capability

When an action is taken upon an infrastructure component or components, the historical data points become invalid for use in the model as predictors, since they describe a state of a different system. Therefore, we provide a mechanism to enable inference in the interim period after the change has taken place, but before all the predictive data used in the original model are again available.

To this end, we propose two approaches. The first approach takes advantage of the fact that in an additive model, imputation of missing data is particularly easy: the correct imputed values are zeroes for the functional components. So the same additive model is used with null contributions at missing predictors. The variance estimates may have to be recomputed by fitting the incomplete model to the columns of the identity matrix and reading off the columns of the smoother matrix, as described in Hastie and Tibshirani (1986). The second approach is more direct and computationally demanding. We introduce models $M_1, \ldots, M_k$. Each $M_i$ is developed based on the data available up to time i after the action is taken. As more data become available, we switch to a finer model, and eventually to a steady state model. The models $M_1, \ldots, M_k$, and the steady state model are members of the post-action family of models.

Seasonality

Seasonal effects are taken into account by the model as described in the control scheme. In addition to better predictive power, these help to understand the expected variations in network performance due to the time of the day and the day of the week, as well as to pick out any long term trend which may be undesirable to have.

Recovery Capability

A special class of recovery models is used when on-line goodness-of-fit procedures indicate that the current model has become inadequate. The battery of recovery models is selected in such a way that one of them is likely to be adequate; type of violation of the goodness-of-fit test plays a role in selection of a suitable recovery model. The battery of recovery models grows with the monitoring experience.

Start-up Capability

A special class of start-up models is used in the initial phase of the monitoring procedure, when transient conditions can be expected. These models are based on progressively increasing history depth, and they converge to one of the steady-state models used in subsequent monitoring.

While the invention has been described in terms of a single preferred embodiment, those skilled in the art will recognize that the invention can be practiced with modification within the spirit and scope of the appended claims.

The invention claimed is:

1. A method for using future behavior of a battery of probes to forecast and diagnose network performance, comprising the steps of:

consolidating normal network data and data returned from a battery of EPP probes into a single model matrix, a probe data set in said returned data including at least a time of said probe and a user performance measure;

predicting a future value of said user performance measure from predictor variables in said single model matrix, values of said predictor variables being lagged from said probe time by a prediction horizon;

generating an alarm signal if said predicted future value of the performance measure is above a threshold value;

observing an actual value of said performance measure at the predicted time, said alarm signal being FALSE if the actual value is below a lower alarm threshold and an alarm signal being MISSED if no alarm signal was generated and the actual value is above an upper alarm threshold; and setting by trial and error said threshold value and said prediction horizon to achieve a rate of said false alarms below a specified limit.

2. The method of claim 1, wherein said predicting step further comprises the steps of:

reducing a dimensionality of said single model matrix by performing stepwise linear regression, at each step adding a most significant network node and deleting a least significant network node, a standard F test providing a significance statistic, until no addition or deletion is significant;

fitting functions of said predictor variables to an additive model; and generating from said additive model an estimated mean of said future value of said user performance measure of said EPP probe, an estimated variance of said estimated mean, and for each predictor variable an estimated variance of an estimated contribution to said future value of said predictor variable.

3. The method of claim 1, further comprising the step of deriving a control scheme for said EPP probe by selecting coefficients for a formula for said alarm threshold, said alarm threshold formula including a constant term, a seasonality term and a term containing an estimated standard deviation of said future value of said user performance measure, wherein a rate of said missed alarms in said trial and error setting step is determined to be acceptable.

4. The method of claim 1, wherein said model matrix includes for each EPP probe said user performance measure is a response time Y;

said time of said probe is a time t when said response time Y was observed;

said prediction horizon has a value h; and wherein for each of said predictor variables said lagged value is taken at, or most recently prior to, time t-h.

5. The method of claim 1, further comprising the steps of:

obtaining a list of models, one for each said linear regression step, a model for a last step providing a selected subset of predictor variables;

using a partial stepwise additive procedure to further reduce said dimensionality, said dimensionality being the number of a plurality of said network nodes; and determining a scale of EPP probe values, said scale being ordered by predictive power.

6. The method of claim 1, further comprising the step of determining interaction terms for said additive model, said interaction terms being a function of more than one predictor variable.

7. The method of claim 3, wherein said step of deriving a control scheme uses profile curves, said profile curves reflecting expected values of said user performance measure based on normally observed regularities in variation of values of said user performance measure.

8. The method of claim 7, wherein said normally observed regularities include variations in a weekly cycle and variations in a daily cycle.

9. The method of claim 1, further comprising the step of presenting a graphical summary of unfavorable predictors in response to triggering of said alarm threshold.

10. The method of claim 2, further comprising the steps of determining whether said additive model is adequate and triggering a model alarm if said additive model is determined not to be adequate; and identifying elements of said additive model whose characteristics triggered said model alarm, said identifying step being initiated by said model alarm.

11. The method of claim 10, further comprising the steps of:

selecting a new predictive model from a battery of recovery models; and building said new predictive model over time as data is accumulated for said predictor variables.

12. The method of claim 1, wherein a predictive model is developed for a plurality of prediction horizons, one model at a time.

13. A system for using future behavior of a battery of probes to forecast and diagnose network performance, comprising:

a single model matrix comprising normal network data and responses to a battery of probes;

profile curves corresponding to said battery, said profile curves reflecting expected response times based on recent history of said probes;

an additive model that predicts the behavior of a function of said probes at a future time, said function being defined in terms of predictor variables in said model matrix, said function being selected by advanced statistical methods, and said additive model being applied cyclically to reduce a variable space of said predictor variables in said single model matrix;

alarm thresholds based on deviation between said profile curves and behavior predicted by said additive model, said alarm thresholds being selected to assure a predictably low rate of false alarms; and a graphical summary of unfavorable predictors in response to triggering of said alarm threshold.

14. A system as in claim 13, further comprising:

a monitor for determining whether said additive model is adequate, said monitor triggering a model alarm if said additive model is determined not to be adequate; and a diagnostic for identifying elements of said additive model whose characteristics triggered said model alarm, said diagnostic being initiated by said model alarm.

15. A system as in claim 13, wherein said cyclic application of said model uses an F statistic to control addition and deletion of variables in said variable space.

16. A system as in claim 13, wherein said cyclic application of said model uses a subset of variables determined by a stepwise linear regression (SLR).

17. A computer implemented system for using future behavior of a battery of probes to forecast and diagnose network performance, comprising:

computer code for consolidating normal network data and data returned from a battery of EPP probes into a single model matrix, a probe data set in said returned data including at least a time of said probe and a user performance measure;

computer code for predicting a future value of said user performance measure from predictor variables in said single model matrix, values of said predictor variables being lagged from said probe time by a prediction horizon;

computer code for generating an alarm signal if said predicted future value of the performance measure is above a threshold value;

computer code for observing an actual value of said performance measure at the predicted time, said alarm signal being FALSE if the actual value is below a lower alarm threshold and an alarm signal being MISSED if no alarm signal was generated and the actual value is above an upper alarm threshold; and computer code for setting by trial and error said threshold value and said prediction horizon to achieve a rate of said false alarms below a specified limit.

18. The computer implemented system of claim 17, wherein said computer code for predicting further comprises:

computer code for reducing a dimensionality of said single model matrix by performing stepwise linear regression, at each step adding a most significant network node and deleting a least significant network node, a standard F test providing a significance statistic, until no addition or deletion is significant;

computer code for fitting functions of said predictor variables to an additive model; and computer code for generating from said additive model an estimated mean of said future value of said user performance measure of said EPP probe, an estimated variance of said estimated mean, and for each predictor variable an estimated variance of an estimated contribution to said future value of said predictor variable.

19. The computer implemented system of claim 17, further comprising computer code for deriving a control scheme for said EPP probe by selecting coefficients for a formula for said alarm threshold, said alarm threshold formula including a constant term, a seasonality term and a term containing an estimated standard deviation of said future value of said user performance measure, wherein a rate of said missed alarms in said trial and error setting step is determined to be acceptable.

20. The computer implemented system of claim 18, further comprising:

computer code for determining whether said additive model is adequate and for triggering a model alarm if said additive model is determined not to be adequate; and computer code for identifying elements of said additive model whose characteristics triggered said model alarm, said identifying step being initiated by said model alarm.

* * * * *